(12) United States Patent
Mushikabe et al.

(10) Patent No.: US 10,642,235 B2
(45) Date of Patent: May 5, 2020

(54) CONTROL APPARATUS, CONTROL METHOD, AND CONTROL SYSTEM THAT PROVIDE DISPLAY CONTROL TO DISPLAY IMAGES ASSOCIATED WITH MASTER AND SLAVE DEVICES

(71) Applicant: YAMAHA CORPORATION, Hamamatsu-shi (JP)

(72) Inventors: Kazuya Mushikabe, Hamamatsu (JP); Akihiko Suyama, Hamamatsu (JP); Keisuke Tsukada, Hamamatsu (JP); Shinichiro Kato, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 114 days.

(21) Appl. No.: 15/898,276

(22) Filed: Feb. 16, 2018

(65) Prior Publication Data
US 2018/0173178 A1    Jun. 21, 2018

Related U.S. Application Data

(63) Continuation of application No. PCT/JP2016/073059, filed on Aug. 5, 2016.

(30) Foreign Application Priority Data

Aug. 18, 2015  (JP) ................................. 2015-161059

(51) Int. Cl.
*G05B 15/02* (2006.01)
*G06F 13/00* (2006.01)
(Continued)

(52) U.S. Cl.
CPC ........... *G05B 15/02* (2013.01); *G06F 3/0488* (2013.01); *G06F 3/04842* (2013.01); *G06F 13/00* (2013.01); *H04L 41/22* (2013.01)

(58) Field of Classification Search
CPC ..... G05B 15/02; G06F 13/00; G06F 3/04842; G06F 3/0488; H04L 41/22
See application file for complete search history.

(56) References Cited

U.S. PATENT DOCUMENTS 5,760,774 A * 6/1998 Grossman ............. G06F 3/0481
715/835
7,607,091 B2 * 10/2009 Song .................. H04B 7/18528
709/201
(Continued)

FOREIGN PATENT DOCUMENTS

JP   2005148565 A      6/2005
JP   2005150901 A  *   6/2005
(Continued)

OTHER PUBLICATIONS

International Search Report issued in Intl. Appln. No. PCT/JP2016/073059 dated Oct. 25, 2016. English translation provided.
(Continued)

*Primary Examiner* — Tejal Gami
(74) *Attorney, Agent, or Firm* — Rossi, Kimms & McDowell LLP (57) ABSTRACT

A control apparatus can include a network interface that achieves a connection to a network, a user interface that accepts a selection operation from among images displayed on a display portion, and at least one processor that implements stored instructions to execute a plurality of tasks, which can include a control task, a designation task, and a display control task. The control task is configured to, through the network, control a plurality of external devices that transmit or receive content data. The designation task is configured to designate an image to display on the display portion. The display control task is configured to display, for each of the plurality of external devices, an image relating to the respective external device on the display portion. The
(Continued)

display control task changes an image selected through the user interface to the image designated by the designation task.

11 Claims, 11 Drawing Sheets

(51) Int. Cl.
*G06F 3/0488* (2013.01)
*G06F 3/0484* (2013.01)
*H04L 12/24* (2006.01)

(56) References Cited

U.S. PATENT DOCUMENTS

| | | | |
|---|---|---|---|
| 2003/0158927 A1* | 8/2003 | Sagey | H04L 12/2803 709/223 |
| 2003/0193601 A1* | 10/2003 | Kobayashi | G06F 3/04817 348/333.01 |
| 2005/0138666 A1 | 6/2005 | Narusawa et al. | |
| 2011/0093799 A1* | 4/2011 | Hatambeiki | G08C 17/02 715/763 |
| 2011/0302300 A1 | 12/2011 | Kikkawa et al. | |
| 2015/0128050 A1* | 5/2015 | Cormican | H04N 21/4143 715/734 |
| 2016/0057029 A1* | 2/2016 | Iida | H04W 4/70 709/224 |
| 2017/0315715 A1* | 11/2017 | Fujita | G06F 13/00 |

FOREIGN PATENT DOCUMENTS

| | | |
|---|---|---|
| JP | 2005150901 A | 6/2005 |
| JP | 2006215725 A | 8/2006 |
| JP | 2011253370 A | 12/2011 |
| WO | 2014185056 A1 | 11/2014 |

OTHER PUBLICATIONS

Written Opinion issued in Intl. Appln. No. PCT/JP2016/073059 dated Oct. 25, 2016.

Office Action issued in Japanese Appln. No. 2015-161059 dated Aug. 20, 2019. English translation provided.

* cited by examiner

CONTROL APPARATUS, CONTROL METHOD, AND CONTROL SYSTEM THAT PROVIDE DISPLAY CONTROL TO DISPLAY IMAGES ASSOCIATED WITH MASTER AND SLAVE DEVICES

CROSS REFERENCE TO RELATED APPLICATIONS

The present application is a continuation application of International Patent Application No. PCT/JP2016/073059, filed on 5 Aug. 2016, which claims priority to Japanese Patent Application No. 2015-161059, filed on 18 Aug. 2015. The contents of these applications are incorporated herein by reference in their entirety.

BACKGROUND OF THE INVENTION

1. Field of the Invention

The present invention, in each aspect thereof, relates to a control apparatus, a control method, and a control system for a plurality of external devices that are connected to a network and transmit or receive content data.

2. Description of the Related Art

JP 2005-148565 A (hereinafter, referred to as Patent Literature 1) discloses an audio delivery system. The audio delivery system is capable of performing a synchronous reproduction of audio data streamed from a server to a network at a plurality of client apparatus. With indoor client apparatus installed in every room, for example, this system makes it possible for a user to listen to the same audio data in any of the rooms.

In the system described in Patent Literature 1, each client apparatus is installed separately apart from each other. Therefore, if all the client apparatus are centrally managed using, for example, a user's mobile terminal, the user can operate each client apparatus with the mobile terminal at hand. Then, there is no need for the user to move to any place where each client apparatus is installed. But if the number of the pieces of the client apparatus to be centrally managed with the mobile terminal increases, it follows that information on a number of the client apparatus is displayed on the mobile terminal. Therefore, there is a possibility that the user would not understand which of the client apparatuses the displayed information relates to. In such a case, since the user is not easily accessible to the information on the client apparatus, it is likely that the management and operation of respective client apparatus become troublesome to the user.

SUMMARY OF THE INVENTION

In view of the above-mentioned problem, aspects of the present invention include a control apparatus, a control method, and a control system, that make it easier for a user to visually understand a plurality of external devices to control.

One aspect is the control apparatus that can include a network interface that achieves a connection to a network, a user interface that accepts a selection operation from among images displayed on a display portion, and at least one processor that implements stored instructions to execute a plurality of tasks, which can include a control task, a designation task, and a display control task. The control task is configured to, through the network, control a plurality of external devices that transmit or receive content data. The designation task is configured to designate an image to display on the display portion. The display control task is configured to display, for each of the plurality of external devices, an image relating to the respective external device on the display portion. The display control task changes an image selected through the user interface to the image designated by the designation task.

The present development makes it easier for a user to visually understand each external device to control with the control apparatus, even in a case where a plurality of external devices are connected to a network.

DETAILED DESCRIPTION

Embodiment 1

Figure 1:
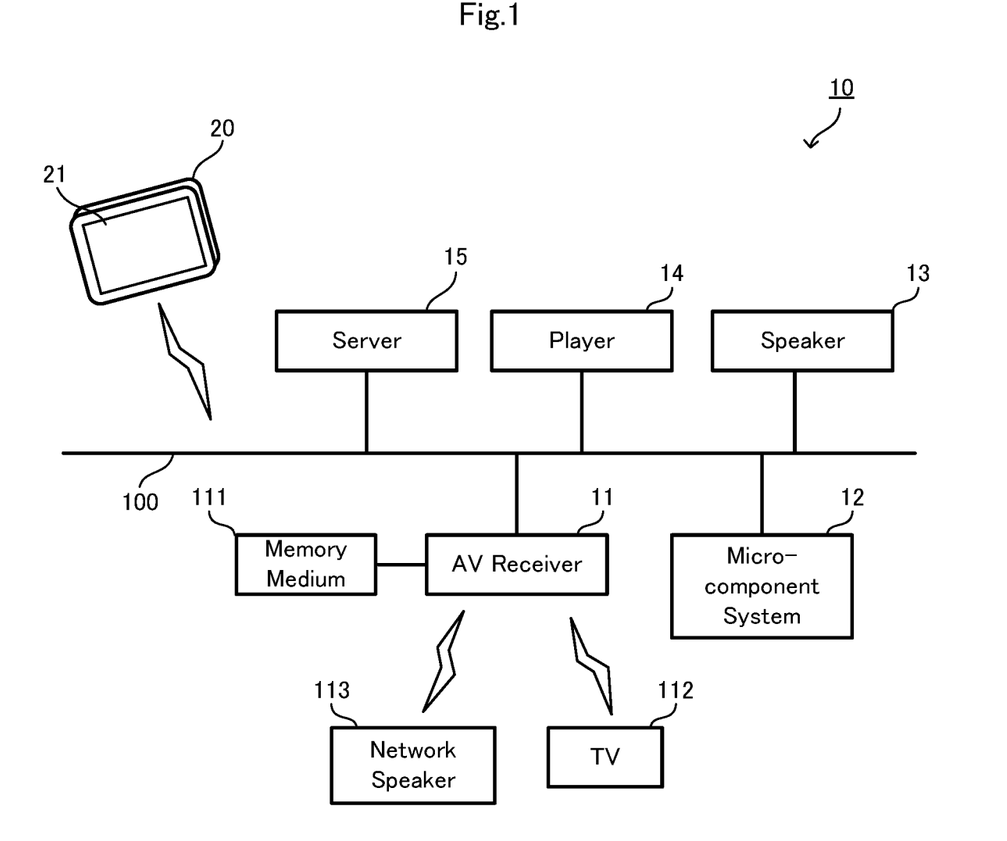
FIG. 1 is a diagram showing a configuration of an audio reproduction system according to an embodiment 1 according the present invention.

FIG. 1 is a diagram showing a configuration of an audio reproduction system 10 according to an embodiment 1 of the present invention. The audio reproduction system 10 is an example of a "control system" according to the present invention.

The audio reproduction system 10 includes an AV receiver 11, a micro-component system 12, a speaker 13, a player 14, a server 15 and so forth. These components are connected to a network 100. The network 100 can be, for example, a LAN (Local Area Network) wired in a building. The devices, such as the AV receiver 11 and the other components, that are connected to the network 100 are respectively installed in a plurality of rooms, such as living room, bedrooms, and the like in the building.

FIG. 1 illustrates the AV receiver 11 connecting to, either through wired connection or wireless connection, a storage medium 111, a TV (television) 112, and a network speaker 113. The storage medium 111 can be a flash memory and/or a hard disk drive, etc., for example. The AV receiver 11 transmits music data and/or video data stored in the storage medium 111 to the TV 112 and the network speaker 113, for example, and the TV 112 and the network speaker 113 reproduce the data. The server 15 can be a network storage, such as NAS (Network Attached Storage), for example.

The AV receiver 11, the micro-component system 12, the speaker 13, and the player 14 reproduce the music data. The music data to be reproduced can be either data stored in a memory of each device, or data read out from a storage medium, such as a CD or HDD, that is connected to each device. Moreover, in this embodiment, each device can transmit and receive music data, making it possible to acquire the music data from other devices. For example, the AV receiver 11 can acquire music data stored in the server 15, and reproduce the music data at the TV 112 and/or the network speaker 113.

The AV receiver 11, the micro-component system 12, the speaker 13, the player 14, and the server 15 that are connected to the network 100 each are an example of an "external device." Also, music data is an example of "content data," which can be video data.

A communication terminal 20 can connect to, either through wired connection or wireless connection, the network 100. The communication terminal 20 accepts a user's operation, then transmits the user's operation to each device through the network 100, to control each of the connected devices. The communication terminal 20 is an example of the "control apparatus" according to the present invention.

The communication terminal 20 has a display (device) 21. On the display 21, an operation screen for operating the AV receiver 11, the micro-component system 12, the speaker 13, and the player 14 can be displayed. The operation screen permits the user to perform, for example, power supply (turn on/off) operation, sound volume control operation, and operations for selection of music, play, skip, etc., to the devices. The communication terminal 20 can be any device, such as smart phone, tablet, or laptop computer, having a display 21, or any device that can display a display screen by connecting to an external display device (such as display, projector, etc.).

A screen displayed on the display 21 of the communication terminal 20 is explained below. On the display 21 of the communication terminal 20, a controller screen can be displayed. By carrying out operations following the controller screen, the user can operate the AV receiver 11, the micro-component system 12, the speaker 13, and the player 14. In this embodiment, the display 21 of the communication terminal 20 is a touch panel (user interface) type display. Therefore, pressing (touching) an operation image displayed on the display 21 permits the user to input to the communication terminal 20 an operation that depends on the operation image.

Figure 2:
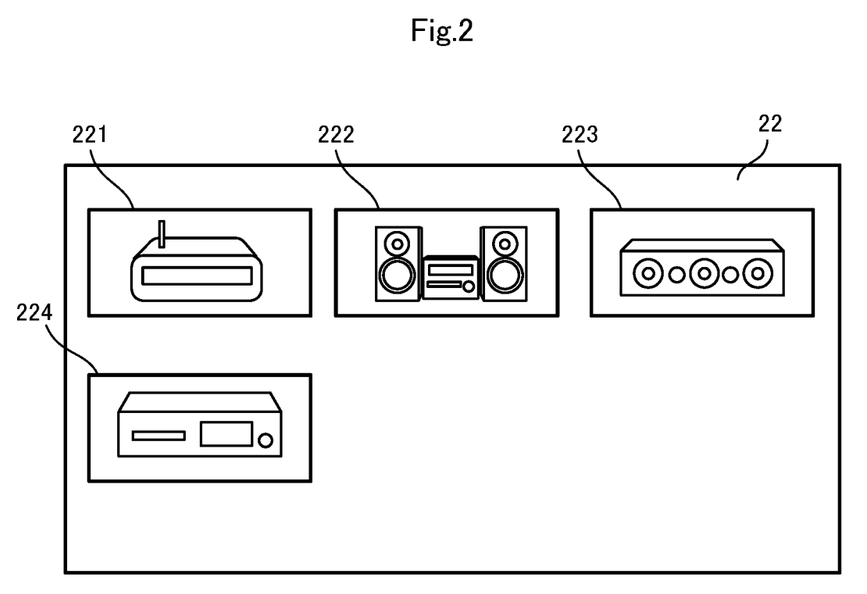
FIG. 2 is a diagram showing a controller screen that is displayed on a display.

FIG. 2 is a diagram showing a controller screen 22 displayable on the display 21. On the controller screen 22 displayed on the display 21, button image 221, button image 222, button image 223, and button image 224 associated with respective devices operable through the communication terminal 20 can be displayed. The button image 221 is associated with the AV receiver 11. When the user touches the button image 221, an operation screen for the AV receiver 11 (not shown in FIG. 2) is displayed on the display 21. Likewise, the button image 222, button image 223, and button image 224 are associated with the micro-component system 12, the speaker 13, and the player 14, respectively.

So that the user can intuitively understand which devices are respectively associated with the images, images relating to the devices (hereinafter, referred to as device images) can be respectively displayed in the button image 221, button image 222, button image 223, and button image 224. In this embodiment, the user can designate a device image to display in each of the button image 221, button image 222, button image 223, and button image 224. Here, in FIG. 2, an example of the controller screen 22 displaying the device images respectively in the button image 221, button image 222, button image 223, and button image 224 is shown.

Hypothetically, in a case where the images automatically decided by the application side are displayed respectively in the button image 221, button image 222, button image 223, and button image 224, the user may not understand which to select from among the button image 221, button image 222, button image 223, and button image 224 when the user wants to operate the AV receiver 11. But if the user designates the images associated with the connected devices, the user can better understand which button images to select to operate different devices.

Here, the "device images" include photos or illustrations of device appearances, photos or illustrations of device installation places, photos or illustrations of device owners, and user preference colors (monochromatic or multicolor, etc.) and so on. With the device appearances displayed in the respective button image 221, button image 222, button image 223, and button image 224, it is made easier for the user to understand which of the button images is associated with which of the devices. With the device installation places displayed in the respective button image 221, button image 222, button image 223, and button image 224, it is made easier for the user to understand which of the button image 221, button image 222, button image 223, and button image 224 to select when the user, for example, wants to operate the device installed in the bedroom. With the device owners displayed in the respective button image 221, button image 222, button image 223, and button image 224, it is made easier for the user to understand which of the button images to select to operate the user's device. With the user preference colors displayed in the respective button image 221, button image 222, button image 223, and button image 224, it is made possible for the user to have the controller screen 22 with a preferred design. With a color displayed as a background in the button image 221, button image 222, button image 223, and button image 224, it is made easier to visually understand texts when the texts and/or the like are displayed in the button image 221, button image 222, button image 223, and button image 224.

A procedure for customizing the controller screen 22 is explained below. The procedure below is an example of a "control method" according to the present invention.

FIG. 3A, 3B and FIG. 4A, 4B are diagrams explaining a procedure for customizing the controller screen. In FIG. 3A, 3B and FIG. 4A, 4B, a case where a change of device images is made from a state where the device images are displayed in the button image 221, button image 222, button image 223, and button image 224 is explained. Even a case where registration of the device images to display is made from a state where there is no device images displayed in the button image 221, button image 222, button image 223, and button image 224 is similar to the following. Also, in FIG. 3A, 3B and FIG. 4A, 4B, a case where the device image in the button image 221 is changed is explained.

Figure 3A:
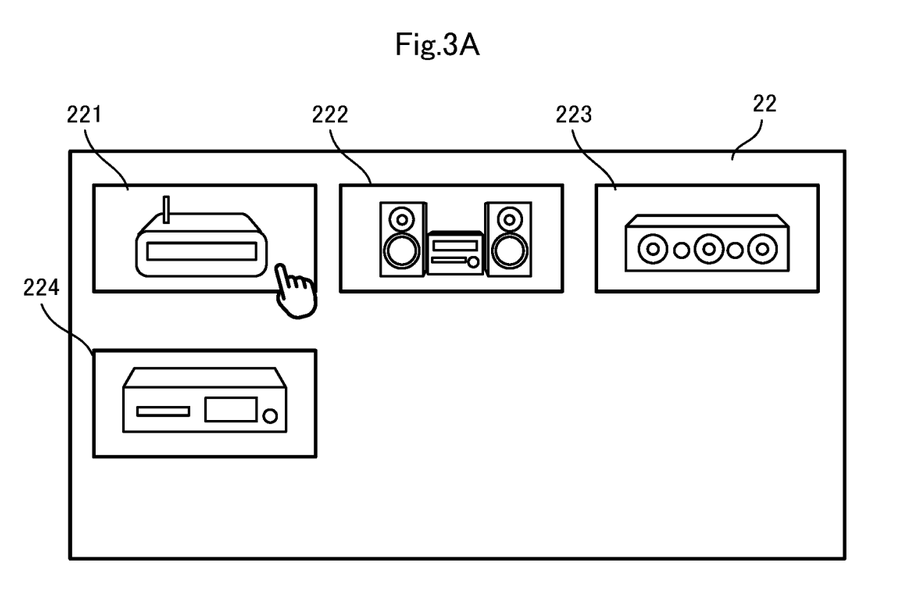
FIGS. 3A and 3B are diagrams explaining a procedure for customizing the controller screen.
Figure 3B:
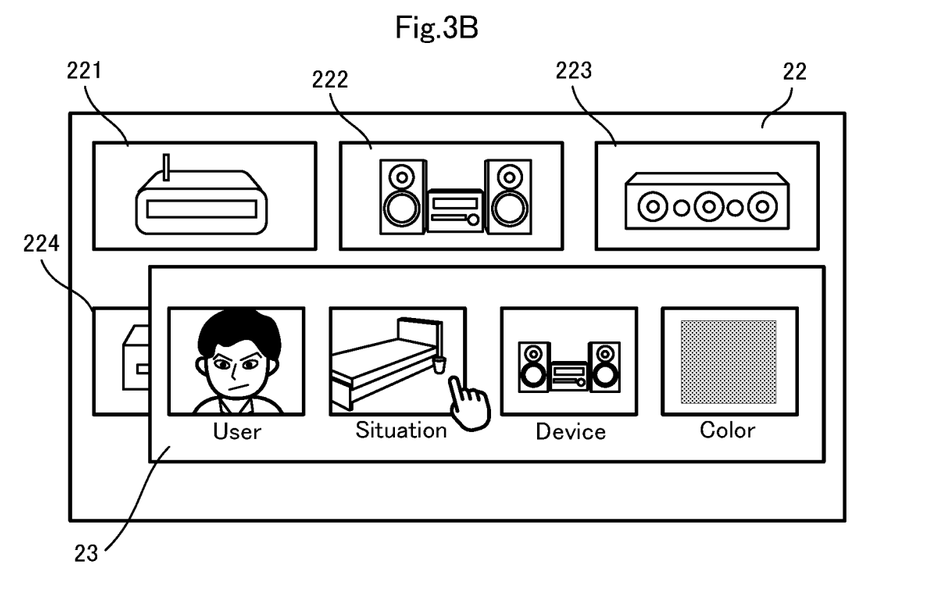

When the user keeps pressing the button image 221 to change the device image thereof for a longer duration (FIG. 3A), an image selection screen 23 is displayed on the controller screen 22 (FIG. 3B). At this time, the button image 222, button image 223, and button image 224, other than the selected button image 221, can become hidden (not displayed). Alternatively, the display density or brightness of the button image 222, button image 223, and button image 224 can be made lowered. This makes it easier for the user to understand which device image of the button image is active to the enable the user to make any desired change.

The image selection screen 23 is a menu screen for selecting a device image to display in the button image 221. The image selection screen 23 displays images in a categorized manner. Specifically, the image selection screen 23 displays images in 4 categories, that is, "User" image, "Situation" image, "Device" image and "Color" image.

The "User" images are images prepared by the user. For example, they can be portraits of target device owners have taken with a camera, and/or images captured from outside and saved. Additionally, it can be configured to start the camera when the "User" image is selected. The "Situation" images are images (photos and/or illustrations) that remind the user of rooms or places where the respective devices are installed. The "Device" images are photos and/or illustrations representing appearances of a variety of devices. The "Color" images are images consisting of only colors (monochromatic and/or multicolor). Colors of the "Color" images can be produced by the user. The "Situation" images, the "Device" images and the "Color" images can be stored in advance in the communication terminal 20.

Figure 4A:
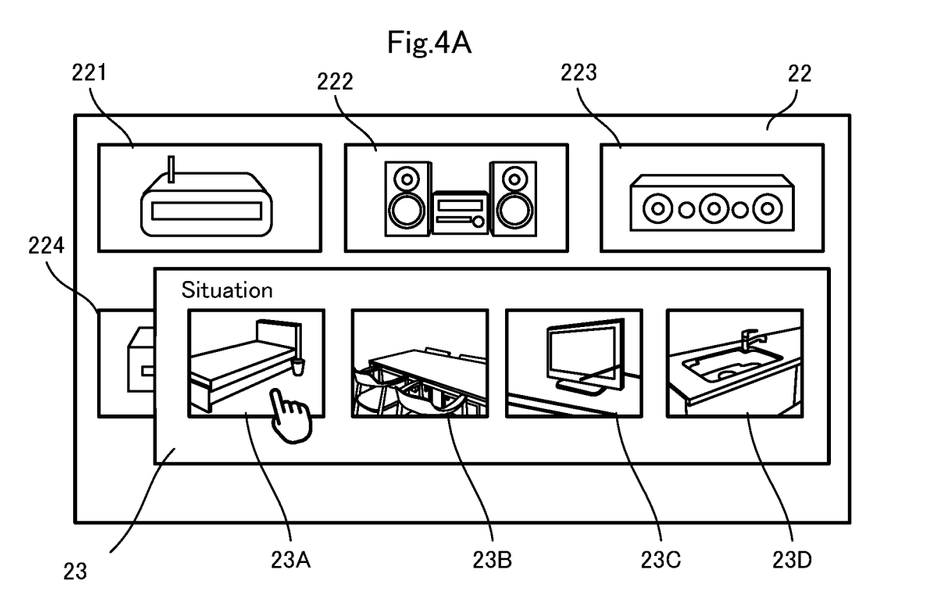
FIGS. 4A and 4B are diagrams further explaining the procedure for customizing the controller screen.
Figure 4B:
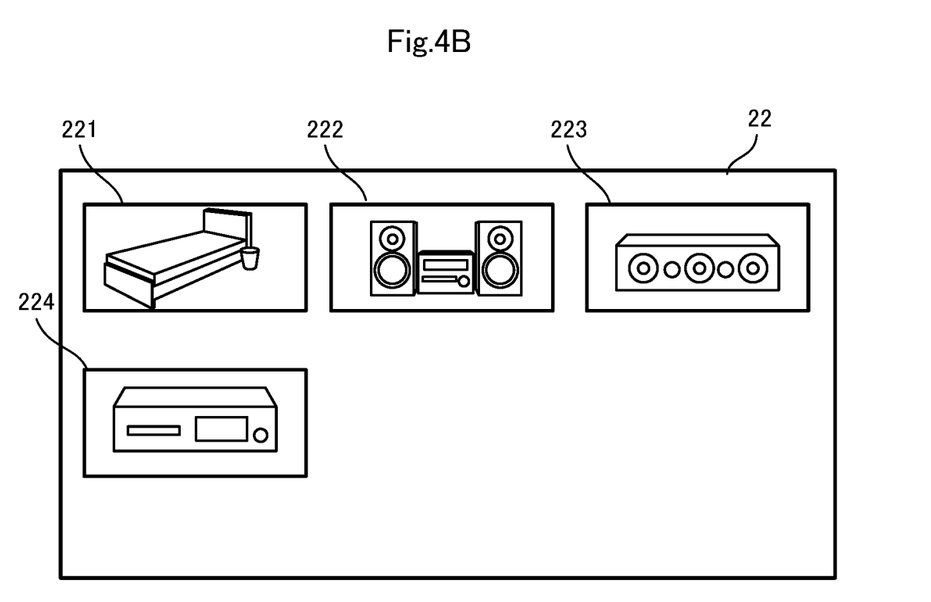

When the user selects, for example, the "Situation" image, a plurality of images categorized in the "Situation" image are displayed on the image selection screen 23, as shown in FIG. 4A. In FIG. 4A, as an example of the "Situation" images, a bedroom image 23A, a dining room image 23B, a living room image 23C, and a kitchen image 23D can be displayed. When the user selects the bedroom image 23A, the bedroom image 23A selected by the user is displayed in the button image 221, as shown in FIG. 4B. This makes it possible for the user to understand visually the button image 221 to be the one to select when the user wants to operate the device located in the bedroom. In this manner, customization of the controller screen 22 can be made.

The procedure explained in FIG. 3A, 3B and FIG. 4A, 4B is an example. The manner of configuring the buttons can be modified accordingly. For example, the buttons can be configured so that the device images in the button image 221, button image 222, button image 223, and button image 224 are displayed overlaid with a setting button or the like. Then, the image selection screen 23 can be displayed when the setting button part is touched. Moreover, on the image selection screen 23, instead of categorizing the photos, a list view of images selectable as images after change can be displayed.

Moreover, in FIG. 3A, 3B and FIG. 4A, 4B, although selected images are displayed in the button image 221, button image 222, button image 223, and button image 224 as they are, the selected images can be displayed in the button image 221, button image 222, button image 223, and button image 224 after they have undergone an image processing (such as blurring, blur processing, mosaic processing or the like).

Figure 5:
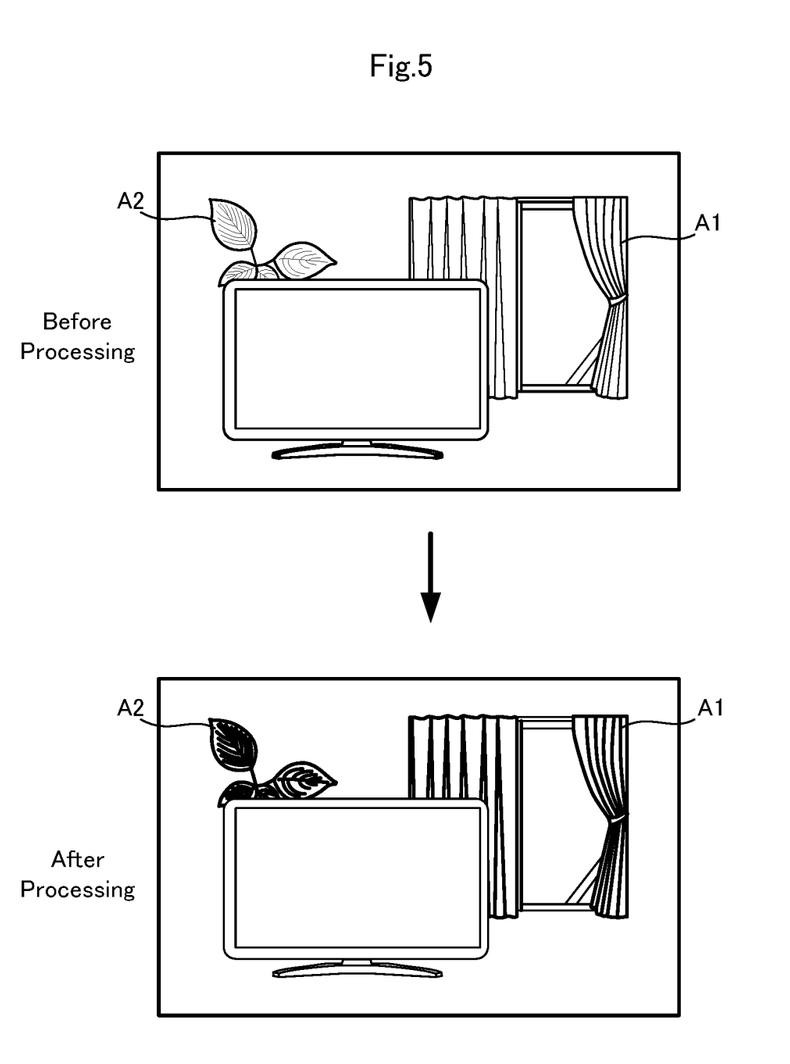
FIG. 5 is a diagram showing an example of an image processing that is applied to an image to be displayed after the change.

For example, FIG. 5 illustrates an example of an image processing that is applied to an image to be displayed after the change. For example, in a case where an object having a strong color (for example, red curtain A1, dark green plant A2, etc.,) as compared with its surroundings is included in an image, a processing can be carried out to increase the level of concentration of a strong color part comparatively while blurring the whole. This makes it possible to display images with color characteristics in the respective button image 221, button image 222, button image 223, and button image 224 while blurring the whole. By displaying the images having undergone an image processing in the respective selected button image 221, button image 222, button image 223, and button image 224, it is possible to increase customizability of the controller screen 22 further.

From the controller screen 22, the user can manage a plurality of devices being grouped. Specifically, the user can group some of the devices from among the AV receiver 11, the micro-component system 12, the speaker 13, and the player 14, and then set a master device and slave devices from the grouped devices. In a case where a plurality of devices are grouped, a device that is set as the master device can transmit the music data to reproduce by itself to the rest of the grouped devices, and reproduces the same music data synchronously with each other within the grouped devices.

Figure 6:
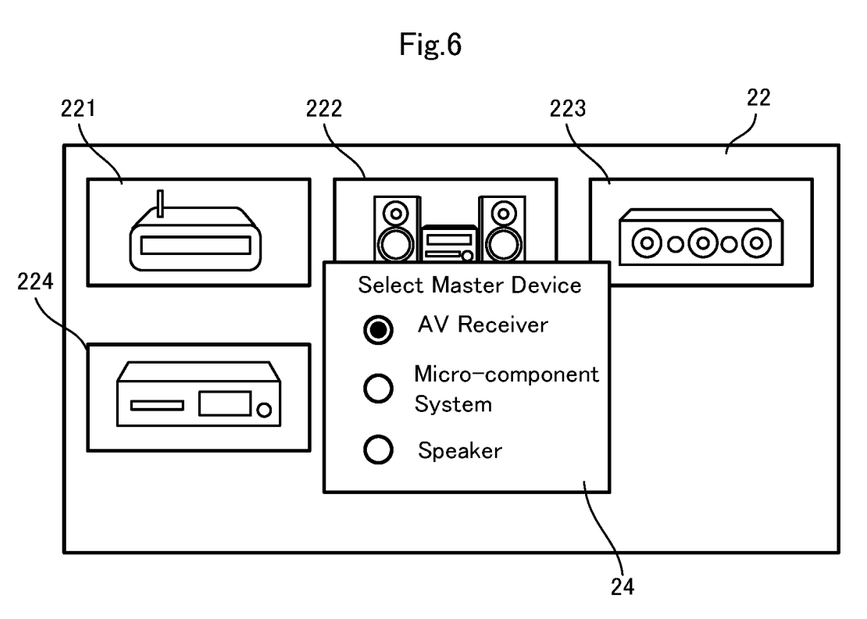
FIG. 6 is a diagram explaining a way to set a master device from among grouped devices.

FIG. 6 explains a way to set a master device from among the grouped devices. Grouping of the devices can be carried out, for example, by the user's selecting a plurality of devices from a menu screen (not shown). Then, a master device set screen 24 is displayed on the controller screen 22. On the master device set screen 24, the selected devices are displayed. The user selects a device to set as the master device from the master device set screen 24. The devices grouped but not selected to the master device are set as slave devices.

In the case where a plurality of devices are grouped, a plurality of button images associated with the grouped devices can be aggregated into one button image.

Figure 7A:
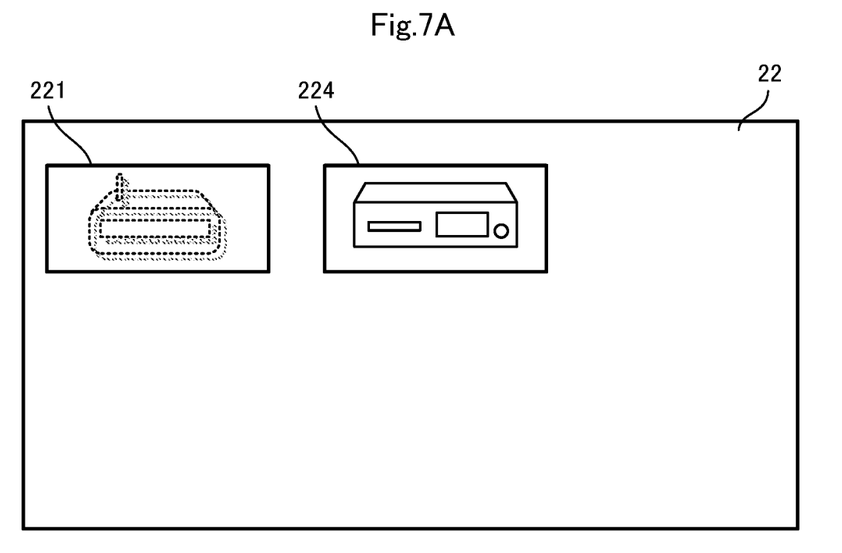
FIGS. 7A and 7B are diagrams showing a controller screen with an aggregated representation of a plurality of button images.
Figure 7B:
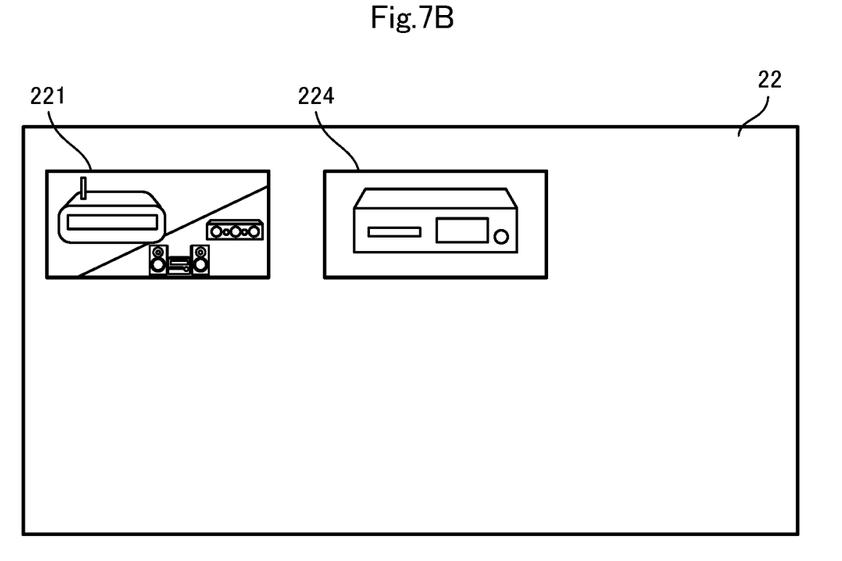

FIGS. 7A and 7B illustrate a controller screen 22 with an aggregated representation of a plurality of button images. In FIGS. 7A and 7B, a case where the AV receiver 11, the micro-component system 12, and the speaker 13 are grouped and with the AV receiver 11 set as the master device is explained.

On the controller screen 22 shown in FIG. 7A, the device image in the button image 221 associated with the AV receiver 11 that is set as the master device is displayed blurredly. Also, the button image 222, and button image 223 associated with the micro-component system 12 and the speaker 13 that are set as the slave devices are hidden (not-displayed).

On the controller screen 22 shown in FIG. 7B, the button image 221 displays the button image 222 and button image 223 associated with the devices respectively set as the master device and the slave devices compositely. Also, the button image 222 and button image 223 respectively associated with the micro-component system 12 and the speaker 13 that are set as the slave devices are hidden (not-displayed). In this case, it is made easier for the user to understand the device set as the master device and the devices set as the slave devices.

In either case of FIG. 7A and FIG. 7B, the user can understand that the plurality of devices are grouped.

Configuration and operation of the communication terminal 20 that performs the display control as set forth above are explained below.

Figure 8:
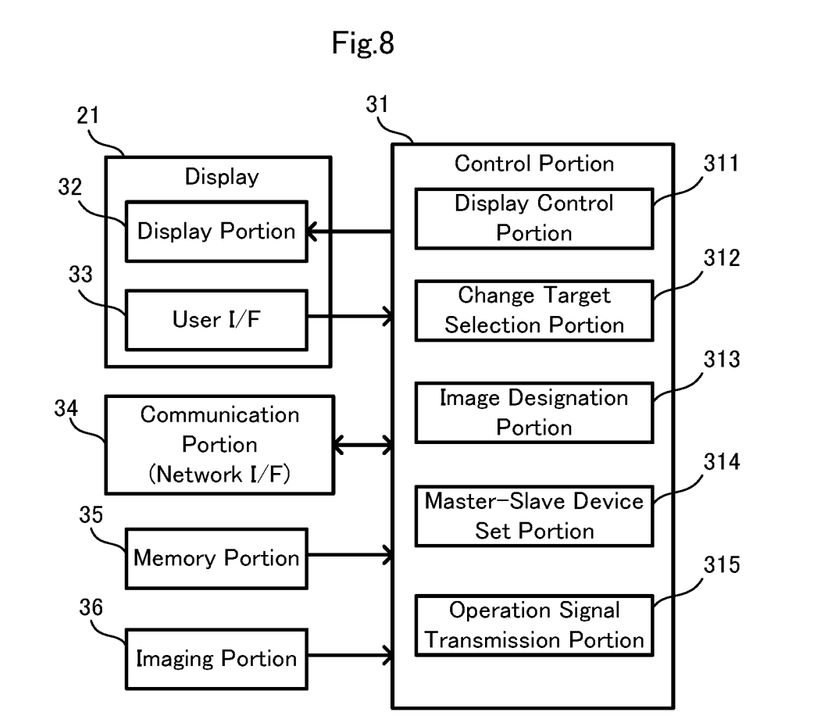
FIG. 8 is a block diagram showing a configuration of a communication terminal.

FIG. 8 is a block diagram showing a configuration of the communication terminal 20. The communication terminal 20 includes a control portion 31, a display portion 32, a user I/F (interface) 33, a communication portion 34, a memory portion 35, and an imaging portion 36.

The display portion 32 and the user I/F 33 constitute the above-mentioned touch panel type display 21. The user I/F 33 accepts a user's selection operation of the images, etc. The user I/F 33 can be a physical button-array, an input pad, a mouse, or the like. The communication portion 34 allows a connection to the network 100. The communication portion 34 is an example of a "network I/F" (interface). The memory portion 35 stores the "Situation" images, the "Device" images and the "Color" images described above. The imaging portion 36 corresponds to a camera for producing the "User" images.

The control portion 31 can be a microcomputer, which includes a CPU, a RAM, a ROM, and so forth that functions as explained below. The control portion 31 is an example of a "processor" that implements a stored program or instructions to execute a plurality of tasks or steps, such as set forth in FIG. 9.

The display control portion 311 performs a display control of the display portion 32, and displays the controller screen 22 and so on. The display control portion 311 is an example of a comprehensive element that includes a "first display control portion (task)", a "second display control portion (task)", an "image change portion (task)", a "category display portion (task)", an "image enhancement portion or task", an "image non-display portion (task)" and an "image composition portion (task)."

A change target selection portion 312 identifies a button image selected through the user I/F 33 from among the button image 221, button image 222, button image 223, and button image 224 that are displayed on the controller screen 22. When the change target selection portion 312 identifies the selected button image, the display control portion 311 displays the image selection screen 23 explained in FIG. 3B.

An image designation portion 313 identifies a category image that is selected through the user I/F 33 from among a plurality of category images displayed on the image selection screen 23. The category images are the above-mentioned "User" image, the "Situation" image, the "Device" image, and the "Color" image. When the image designation portion 313 identifies a category image, the display control portion 311 changes the image selection screen 23 to the display explained in FIG. 4A. The image designation portion 313 is an example of a comprehensive element that includes a "designation portion (task)", an "image selection screen designation portion (task)," and an "information image designation portion (task)."

Additionally, although the image designation portion 313 identifies a category image based on the user's operation, instead, the category image can be identified automatically. For example, the image designation portion 313 can acquire, from the server 15, device information associated with the button image that is selected through the change target selection portion 312. The device information includes information on, for example, a device installation place, a device owner, and so forth. The image designation portion 313 can be configured to designate, based on the information, an optimal "User" image, "Situation" image, or the like. In this case, the image designation portion 313 is an example of an "acquisition portion (task)."

A master-slave device set portion 314 identifies a device that is selected by the user I/F 33 through the master device set screen 24 displayed by the display control portion 311, and sets the selected device as the master device. And it also sets devices that have not been set as the master device as slave devices. When the master-slave device set portion 314 sets the devices as the master device and the slave devices, respectively, the display control portion 311 applies an image processing to the button image that is associated with the master device, while hiding (non-displaying) the button images that are associated with the slave devices. The master-slave device set portion 314 is an example of a "set portion (task)."

An operation signal transmission portion 315 transmits operations that are input through operation screens for the respective devices displayed on the display 21 to the respective devices through the communication portion 34.

Figure 9:
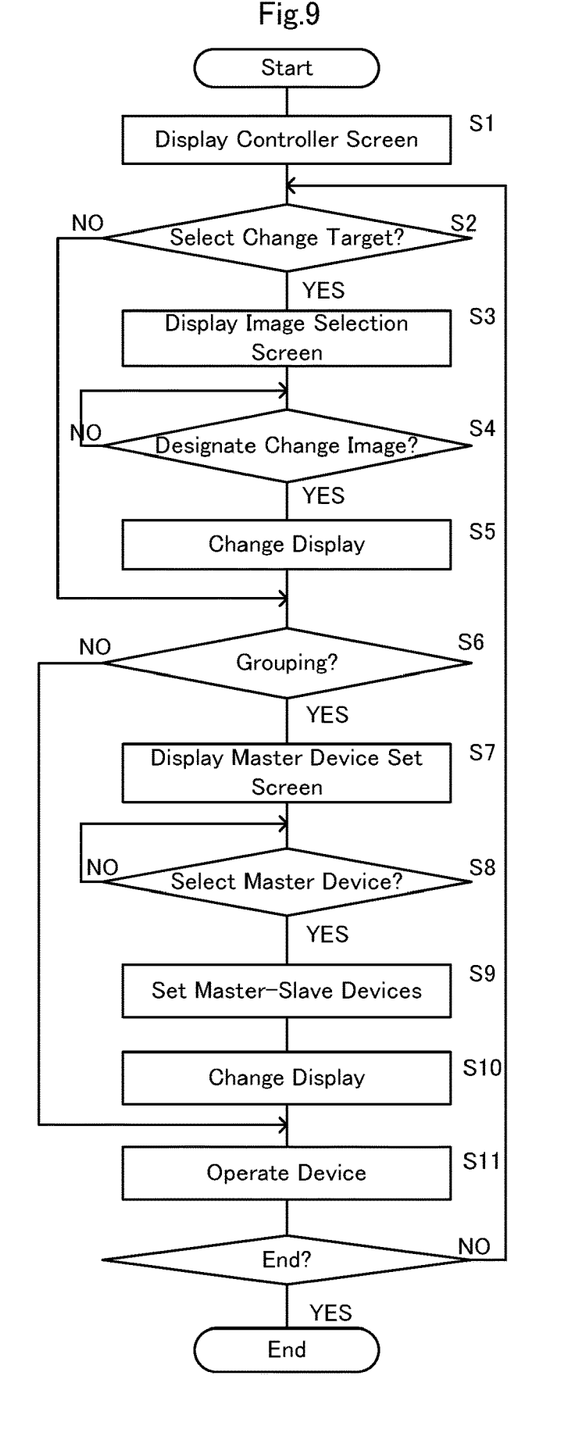
FIG. 9 is a flow chart showing a process performed at the communication terminal.

FIG. 9 is a flow chart showing a process performed at the communication terminal 20, by the control portion 31. When a program for operating the respective devices is booted up, the control portion 31 causes the controller screen 22 to be displayed on the display 21 (S1). In the case of displaying the controller screen 22 for the first time, in the button image 221, button image 222, button image 223, and button image 224, either predetermined respective device images or nothing may be displayed. Subsequently, the control portion 31 determines whether or not a change target to change the device image is selected from among the button image 221, button image 222, button image 223, and button image 224 on the controller screen 22 (S2).

If no selection of change target is made (S2:NO), the control portion 31 moves to a process at S6 described later. If selection of a change target is made (S2:YES), the control portion 31 causes the image selection screen 23 to be displayed on the display 21 (S3). The control portion 31 determines whether or not an image after the change is designated through the image selection screen 23 (S4). If no designation of image after change is made (S4:NO), the control portion 31 performs S4 repeatedly. If designation of an image after change is made (S4:YES), the control portion 31 changes the display of the device image in the button image that is selected at S2 to the image designated at S4 (S5).

The control portion 31 determines whether to group a plurality of devices or not (S6). Here, the control portion 31 determines whether to group a plurality of devices or not depending on presence or absence of user's operation. If no grouping is made (S6:NO), the control portion 31 moves to a process at S11.

If grouping is made (S6:YES), the control portion 31 causes the master device set screen 24 to be displayed on the display 21 (S7). The control portion 31 determines whether or not a device to set as the master device is selected through the master device set screen 24 (S8). If no selection of device to set as the master device is made (S8:NO), the control portion 31 performs S8 repeatedly. If selection of a device to set as the master device is made (S8:YES), the control portion 31 sets the device selected at S8 as the master device, and sets the rest of the grouped devices as the slave devices (S9).

On the controller screen 22, the control portion 31 causes a plurality of button images that are associated with a grouped plurality of devices to be aggregated into one button image, and causes the aggregated button image to be displayed (S10). In so doing, as explained in FIG. 7A, the control portion 31 can cause the button image associated with the device set as the master device to be displayed blurredly, and can cause the button images associated with the devices set as the slave devices to be hidden (not-displayed). Moreover, as explained in FIG. 7B, the control portion 31 can cause the button images associated with the respective devices set as the master device and the slave devices to be displayed compositely, while causing the button images that are associated with the devices set as the slave devices to be hidden (not-displayed).

When an operation of a device is input through the controller screen 22, the control portion 31 transmits the operation to the device through the network 100 (S11). This allows the user to operate each device, such as the AV receiver 11 or the like, through the communication terminal 20. Then, the control portion 31 determines whether to end the program or not (S12), and ends the process when determining to do so (S12:YES). If determining not to end (S12:NO), the control portion 31 performs a process at S2.

As mentioned above, in this embodiment, it is possible to change displays of the button image 221, button image 222, button image 223, and button image 224 on the controller screen 22 that are to operate the respective devices with. This makes it easier for the user to visually understand kinds, installation places, owners, and so forth of the respective devices even when the number of devices controllable through the communication terminal 20 increases, thereby making the device management and control easier.

Embodiment 2

With a controller screen according to this embodiment, it is possible to change layout of the screen and size of the button images.

Figure 10:
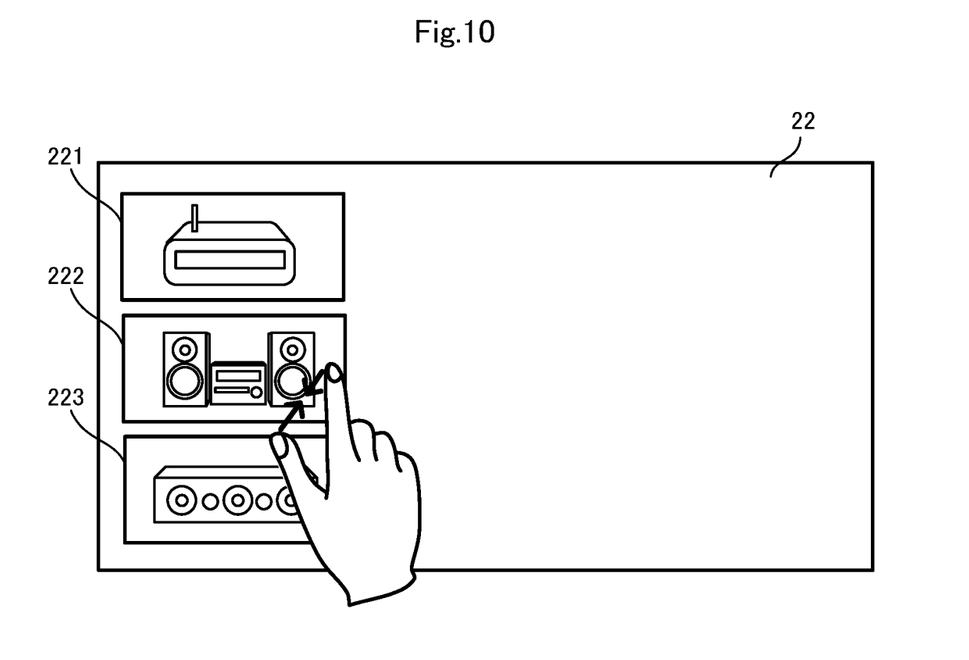
FIG. 10 is a diagram showing a controller screen that is displayed on a display according to an embodiment 2 according to the present invention.

FIG. 10 is a diagram showing a controller screen 22 displayed on a display according to an embodiment 2 according to the present invention. In the case of the controller screen 22 shown in FIG. 10, a plurality of button image 221, button image 222, button image 223, etc., that could not be displayed on one screen can be displayed by changing the image size. When the user wishes to operate a button image not displayed on the controller screen 22, it is necessary for the user to perform an operation for changing the range of display of the controller screen 22, which would result in a troublesome operation.

On that account, this embodiment is configured to allow the user to cause the controller screen 22 to display a smaller representation of the button image 221, button image 222, button image 223, etc., by performing an operation for shrinking the screen with two fingers moving toward each other, in a pinching manner on the screen (hereinafter, referred to as shrink operation).

Figure 11:
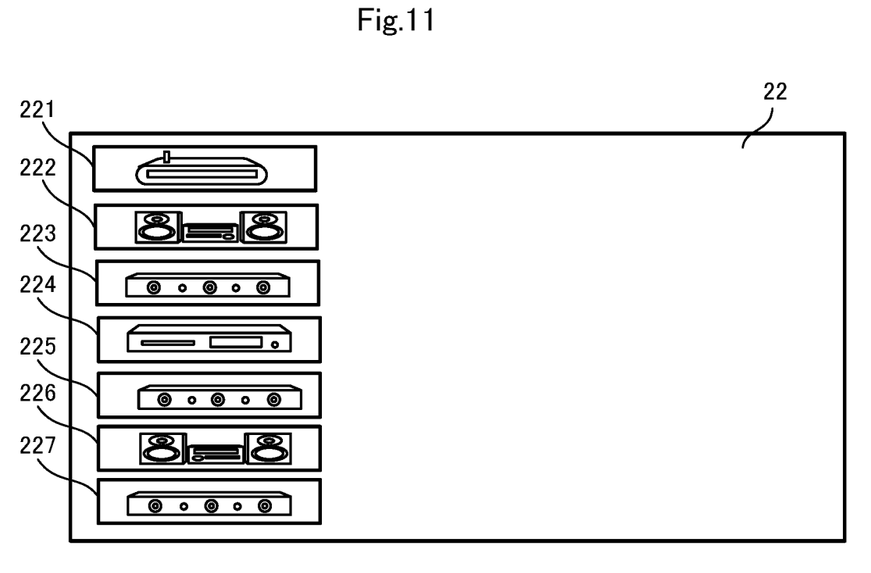
FIG. 11 is a diagram showing an example of the controller screen with a small representation of button images.

FIG. 11 is a diagram showing an example of the controller screen 22 with the smaller representation of the button image 221, button image 222, button image 223, etc. When the shrink operation is performed, vertical sizes of the button images are displayed narrower. Then, button image 224, button image 225, button image 226, and button image 227 that were not displayed in FIG. 10 become visible. With vertical widths of a plurality of button images 221-227 being displayed narrower, it is made possible to treat each of the button images 221-227 as if they are each a line of character string.

Here, although in this example, the button images 221-227 are displayed with only the vertical widths being narrowed, the button images 221-227 can be displayed by reducing the entire image while keeping the aspect ratio constant. Here, although in FIG. 11, the button images 221-227 are displayed in a row, the button images 221-227 in the smaller representation can be displayed in a matrix. Further, this embodiment can be configured so that the user can return to the controller screen 22 shown in FIG. 10 when the user performs an operation for enlarging the screen with two fingers moving away from each other in a pinching out manner on the controller screen 22 shown in FIG. 11, where the button images 221-227 are displayed in the smaller representation. Also, device images displayed in the respective button images 221-227 can be changed in the same manner as in the embodiment 1.

Given the present disclosure, one versed in the art would appreciate that there can be other embodiments and modifications within the scope and spirit of the present development. Accordingly, all modifications attainable by one versed in the art from the present disclosure within the scope and spirit of the present development are to be included as further embodiments of the present development. The scope of the present invention accordingly is to be defined as set forth in the appended claims.

What is claimed is:

1. A control apparatus comprising:
a network interface configured to connect to a network;
a user interface configured to receive a selection operation from among a plurality of images displayed on a display portion; and
at least one processor that implements stored instructions to execute a plurality of tasks, including:
  a control task that controls, through the network, a plurality of external devices that transmit or receive content data;
  a designation task that designates, through the user interface, an image to be displayed on the display portion;
  a display control task that:
    displays, for each of the plurality of external devices, an image relating to the respective external device on the display portion; and
    changes an image selected through the user interface to the image designated by the designation task; and
  a setting task that, upon at least two images being selected among the plurality of images displayed on the display portion:
    sets, through the user interface, among the plurality of external devices:
      one external device associated with one of the at least two images as a master device; and
      a different external device associated with a remaining image of the at least two images as a slave device; and
    groups the master device and the slave device,
  wherein the display control task aggregates the at least two images associated with grouped external devices into one image and hides the remaining image associated with the different external device set as the slave device, and
  wherein the setting task causes the one external device set as the master device to transmit content data to the different external device set as the slave device and causes each of the grouped external devices to reproduce the content data synchronously.

2. The control apparatus according to claim 1, wherein:
the display control task displays, on the display portion, an image selection screen to display thereon a plurality of images categorized by type, and
the designation task designates the image through the image selection screen.

3. The control apparatus according to claim 1, wherein the display control task displays the image designated by the designation task blurred.

4. The control apparatus according to claim 1, wherein:
the plurality of tasks includes an acquisition task that acquires, from outside, information relating to an external device associated with an image selected through the user interface, and
the designation task designates an image based on the acquired information.

5. A control method for a control apparatus having a network interface configured to connect to a network and a user interface configured to receive a selection operation from among a plurality of images displayed on a display portion, the method comprising:

a controlling step of controlling, through the network, a plurality of external devices that transmit or receive content data;

a displaying step of displaying, on a display portion, for each of the plurality of external devices, an image relating to the external device;

a designating step of designating, through the user interface, an image to be displayed on the display portion;

a display controlling step of:
  displaying, for each of the plurality of external devices, an image relating to the respective external device on the display portion; and
  changing an image selected through the user interface to the image designated in the designating step; and a setting step of, upon at least two images being selected among the plurality of images displayed on the display portion:
  setting, through the user interface, among the plurality of external devices:
    one external device associated with one of the at least two images as a master device; and
    a different external device associated with a remaining image of the at least two images as a slave device; and
    grouping the master device and the slave device, wherein the display control step aggregates the at least two images associated with grouped external devices into one image and hides the remaining image associated with the different external device set as the slave device, and wherein the setting step causes the one external device set as the master device to transmit content data to the different external device set as the slave device and causes each of the grouped external devices to reproduce the content data synchronously.

6. The control method according to claim 5, wherein:
the display controlling step displays, on the display portion, an image selection screen to display thereon a plurality of images categorized by type, and
the designating step designates the image through the image selection screen.

7. The control method according to claim 5, wherein the display controlling step displays the image designated in the designating step blurred.

8. The control method according to claim 5, further comprising an acquiring step of:
acquiring, from outside, information relating to an external device associated with an image selected through the user interface; and
designating an image based on the acquired information.

9. A control system comprising:
a plurality of external devices connected to a network and that transmit or receive content data;
a user interface that accepts a selection operation from among a plurality of images displayed on a display portion; and
at least one processor configured to implement stored instructions to execute a plurality of tasks, including:
  a control task that controls, through the network, the plurality of external devices;
  a designation task that designates an image to be displayed on the display portion;
  a display control task that:
    displays, for each of the plurality of external devices, an image relating to the respective external device on the display portion; and
    changes an image selected through the user interface to the image designated by the designation task; and
  a setting task that, upon at least two images being selected among the plurality of images displayed on the display portion:
    sets, through the user interface, among the plurality of external devices:
      one external device associated with one of the at least two images as a master device; and
      a different external device associated with a remaining image of the at least two images as a slave device; and
    groups the master device and the slave device,
  wherein the display control task aggregates the at least two images associated with grouped external devices into one image and hides the remaining image associated with the different external device set as the slave device, and
  wherein the setting task causes the one external device set as the master device to transmit content data to the different external device set as the slave device and causes each of the grouped external devices to reproduce the content data synchronously.

10. The control system according to claim 9, wherein:
the display control task displays, on the display portion, an image selection screen to display thereon a plurality of images categorized by type, and
the designation task designates the image through the image selection screen.

11. The control system according to claim 9, wherein the display control task displays the image designated by the designation task blurred.

* * * * *